Figure 1:
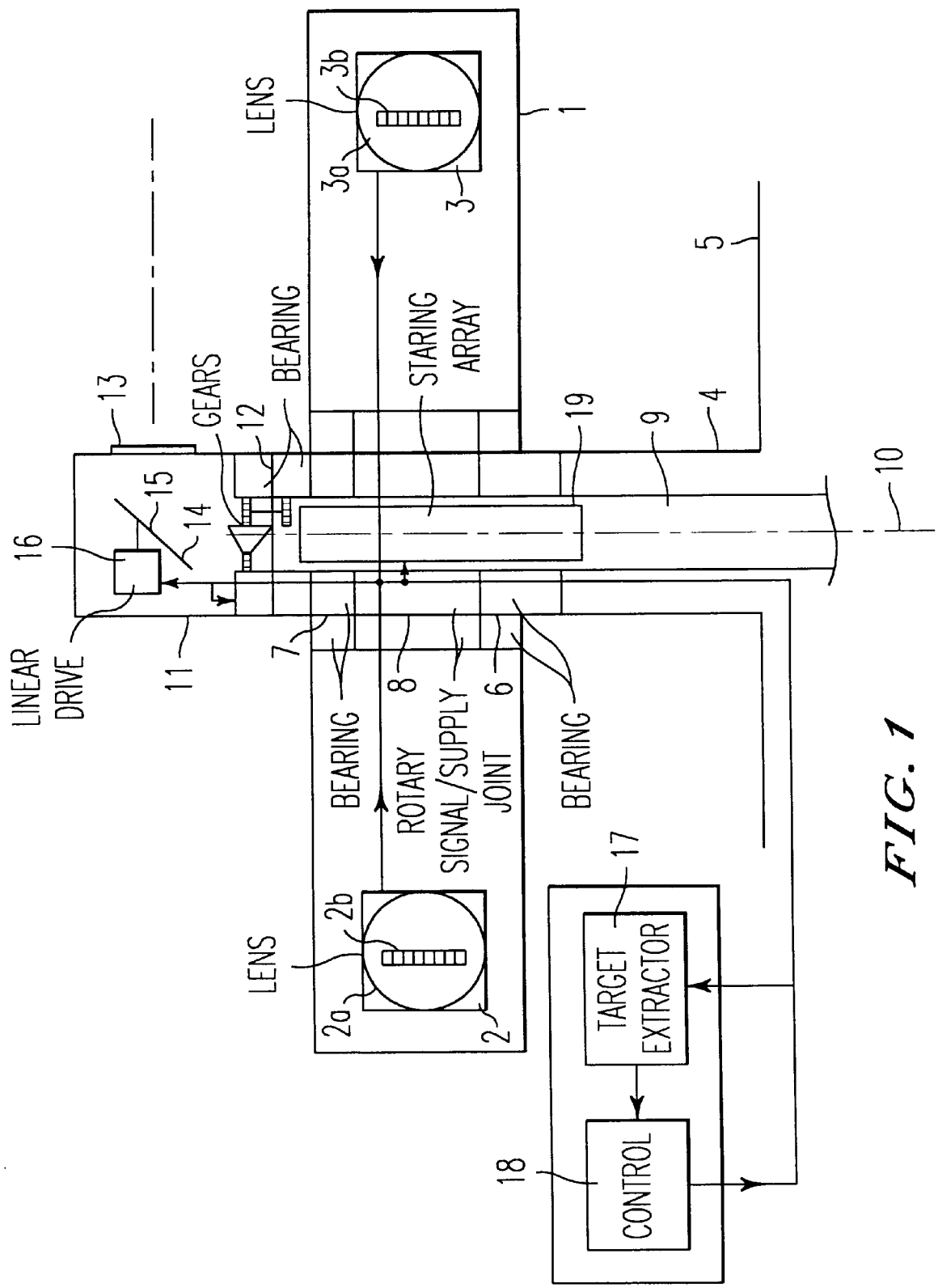

United States Patent [19]
Olbertz

[11] Patent Number: 6,031,605
[45] Date of Patent: *Feb. 29, 2000

[54] ARRANGEMENT FOR THE DETECTION OF TARGETS

[75] Inventor: Antonius Hendricus Maria Olbertz, Hengelo, Netherlands

[73] Assignee: Hollandse Signaalapparaten B.V., Hengelo, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/913,850

[22] PCT Filed: Mar. 14, 1996

[86] PCT No.: PCT/EP96/01164

§ 371 Date: Sep. 26, 1997

§ 102(e) Date: Sep. 26, 1997

[87] PCT Pub. No.: WO96/30778

PCT Pub. Date: Oct. 3, 1996

[30] Foreign Application Priority Data

Mar. 28, 1995 [NL] Netherlands ............... 9500590

[51] Int. Cl.[7] ............... G01B 11/26; H01L 25/00; G02B 26/10
[52] U.S. Cl. ............... 356/141.4; 250/332; 250/334; 356/139.06; 356/141.5
[58] Field of Search ............... 356/139.05–139.08, 356/141.5, 141.4, 4.01; 250/332, 334; 348/135, 145, 146

[56] References Cited

U.S. PATENT DOCUMENTS

| | | |
|---|---|---|
| 4,108,551 | 8/1978 | Weber . |
| 4,298,280 | 11/1981 | Harney . |
| 4,647,761 | 3/1987 | Cojan et al. . |
| 4,830,489 | 5/1989 | Cain et al. . |
| 4,861,996 | 8/1989 | Roth et al. ............... 250/330 |
| 5,485,009 | 1/1996 | Meyzonnetie ............... 356/5.09 |
| 5,528,354 | 6/1996 | Uwira ............... 356/5.01 |
| 5,629,516 | 5/1997 | Olbertz . |

FOREIGN PATENT DOCUMENTS

| | | |
|---|---|---|
| 0205794 | 12/1986 | European Pat. Off. . |
| 2852224 | 6/1980 | Germany . |
| 3325483 | 1/1985 | Germany . |
| 2071957 | 9/1981 | United Kingdom . |

Primary Examiner—Stephen C. Buczinski
Attorney, Agent, or Firm—Oblon, Spivak, McClelland, Maier & Neustadt, P.C.

[57] ABSTRACT

The invention relates to an arrangement for detecting approaching high-velocity targets using rotatable optical detectors (2, 3) of the line array type. With a view to the suppression of false alarms, the arrangement moreover comprises a hollow rotation axis (4) containing a mirror (14) that can be oriented such that a detector of the staring array type, a laser range-finder or a CW Doppler laser detector, all likewise contained in the hollow rotation axis, can be directed at a potential target.

6 Claims, 1 Drawing Sheet

ARRANGEMENT FOR THE DETECTION OF TARGETS

The present invention relates to an arrangement for the detection of targets, comprising a detector unit rotatable about an at least vertical search axis, provided with focusing means and a detector of the line array type for cyclically generating a two-dimensional image representing the surroundings of the arrangement, and a target extractor connected to the detector for generating directions of detected potential targets.

An arrangement of this type is known from EP-B 0.205.794. The aim of the target extractor is to reduce the number of false alarms generated by a detector unit. Without the use of a target extractor, a detector unit will usually generate thousands of false alarms per revolution. If the target extractor possesses all features known in the art, this number can be reduced to only a few false alarms per revolution. By incorporating several detectors in the detector unit and by subsequently combinating the images generated by these detectors, the number of false alarms can still be further reduced.

The present invention is likewise aimed at reducing the number of false alarms, namely by subjecting the individual detected potential targets to a closer examination. It is thereto characterized in that the arrangement furthermore comprises optical verification means for verifying the detected potential targets, which means are controlled on the basis of data generated by the target extractor.

In a favourable embodiment of the invention, the verification means form an integral part of the detector unit, but are incapable of rotation. They are characterized in that an optical axis of the optical verification means at least substantially coincides with the search axis. In an advantageous realisation, the detector unit is positioned such that it is arranged for rotating around a hollow search axis, the optical verification means being contained in the hollow search axis.

A further advantageous embodiment of the invention is characterized in that the optical verification means comprise an optical window provided in a wall section of the hollow search axis that projects beyond the detector unit, and in that the optical verification means comprise a mirror, contained in the hollow search axis, an azimuth direction and an elevation direction of which can, on the basis of data generated by the target extractor, be adjusted in such a way that radiation emanating from a selected potential target is passed on at least substantially parallel to the search axis.

A still further favourable embodiment of the invention has the advantage that the optical window is flat and is characterized in that the optical window can, on the basis of data generated by the target extractor, be adjusted in azimuth direction in such a way that its azimuth direction at least substantially corresponds with the mirror's azimuth direction.

It is now possible to provide the optical verification means with various optical means which can be accommodated in the hollow search axis.

In a first favourable embodiment, the optical verification means comprise an optical detector of the staring array type. Such a detector is highly suitable for verifying a potential target, since it generally allows longer integration periods and has a higher angular resolution than a rotary line array selected for volume search.

In a second favourable embodiment, the optical verification means comprise a laser range-finder which, besides a target verification, also yields a target range.

In a third favourable embodiment, the optical verification means comprise a CW Doppler laser detector which, besides a target verification, moreover yields a target velocity and at least an indication of the range.

An exceptionally favourable embodiment of the apparatus is characterized in that means are provided for optionally placing, in operating conditions, a detector of the staring array type, a laser range-finder or a CW Doppler laser detector in the hollow search axis. This renders it possible to select and position the optimal verification means depending on the operational conditions.

By giving the hollow search axis sufficiently wide dimensions, several optical verification means can be used simultaneously.

The invention will now be further explained in greater detail with reference to FIG. 1 which is a schematic representation in cross-section of an embodiment of the arrangement.

FIG 1. shows an embodiment of the arrangement in cross-section, in which a detector unit 1 comprising two detectors (2, 3) rotates about a hollow search axis (4) which is rigidly attached to a base (5), for instance a deck. Detectors (2, 3) are well known in the art and comprise focusing means (2a, 3a) normally germanium lenses, and one dimensional array detectors (2b, 3b) also called line arrays or linear arrays. Rotation of the detector unit is made possible by known provisions such as an annular shaped direct drive motor with integrated bearing (6), and additional ball bearing (7) for sufficiently supporting detector unit (1) while rotating around hollow search axis (4), a rotary joint (8) for the connection of the supply voltages, for the supply of the command signals to detector unit 1 and for outputting the video signals generated by the detectors (2, 3).

Rotary joint (8) is preferably a slipping assembly, well known in the art. An essential condition for the embodiment is that within the hollow search axis (4), a cavity remains available to incorporate optical verification means to be described below, the optical axis of which at least substantially coincides with the longitudinal axis (10) of the hollow search axis (4). The upper part (11) of the hollow search axis (4) is made rotatable with respect to search axis (4) by means of an additional annular shaped direct drive motor with integrated bearing (12), the stator part of which is connected to hollow search axis (4) and the rotor part of which is connected to upper part (11). Upper part (11) furthermore comprises a flat window (13) and a mirror (14) which can be tilted about an axis of tilt (15), the tilting movement being controlled by means of linear drive (16). In this way, motor (12) may adjust a bearing direction for mirror (14), while linear drive (16) may adjust an elevation direction for mirror (14).

If the rotating detectors (2, 3) observe a potential target, which observation is essentially achieved by a target extractor (17) connected to the detectors through rotary joint (8), extractor (17) generates a direction of the potential target from which control means (18), connected to extractor (17) generate control signals for motor (12) and linear drive (16), such that the potential target can be observed by a detector of the staring array type (19) along the longitudinal axis (10) of hollow search axis (4) via mirror (14) and flat window (13).

During target observation, flat window (13) and mirror (14) are at least substantially stationary. Alternative solutions are to control flat window (13) and mirror (14) by means of a track computer connected to the extractor (17) so that a predicted or measured target trajectory is followed, or to control flat window (13) and mirror (14) on the basis of available roll and pitch signals in such a way that the own motion of the platform or vessel on which the arrangement is mounted is compensated for in a way known in the art. Irrespective of the rotation of detector unit (1) and the vehicle's own motion, the arrangement of FIG. 1 renders it possible to distinguish between a real target and a false alarm. A camera provided with a detector of the staring array type is highly suitable for this purpose. An infrared-sensitive camera of the staring array type (19) is especially suitable since it matches the spectral sensitivity of detectors (2, 3) to a greater extent and can moreover be used at night or in fog conditions.

An advantageous selection of the known systems of lenses disposed in front of the array (19) results in a considerably higher angular resolution than that of detectors (2, 3). In order to increase the sensitivity, the integration period of the array (19) can additionally be selected such that it is considerably longer than the integration period of detectors (2, 3). Particularly, a combination of both factors enables target verification at all times without the reaction time of the arrangement being significantly affected.

Apart from unambiguously determining whether the detection yields a real target or a false alarm, it is usually possible to observe details that are usually imperceptible for detectors (2, 3) such as the type of aircraft or vessel, the number of persons in a rubber dinghy and the like with array (19). The drawback to this is that the image, depending on the position of mirror (14) together with upper part (11), may rotate in bearing. This drawback can be overcome in a manner known in the art by incorporating a Dove prism in cavity (9) which, by gear means also fitted in cavity (9), is continuously rotated through half the bearing angle.

A further, exceptionally suitable verification means is obtained by installing a laser range-finder, as such known in the art, in cavity 9. The strength of an echo reflected by a potential target generally indicates whether or not a real target is involved; moreover, the target range can be directly derived from the delay time.

A likewise exceptionally suitable verification means is obtained by installing a CW Doppler laser detector in cavity 9. A monochromatic laser beam is generated by for instance a CO2 laser and is directed to the potential target via mirror 14 and flat window 13. A part of the beam of light is reflected and directed, together with a reference beam derived from the laser beam, to a detector positioned close to the laser via flat window 13 and mirror 14. The Doppler signal generated by the detector can then be used to determine the dimension and range of the potential target. By linearly modulating the laser in frequency, it is moreover possible to generate range information in a manner known in the art.

The disposition of the above-mentioned and possible other optical means in a uniform housing allows the selection of an optical verification means depending on the operational conditions. This can be effected both manually and automatically, for instance by accommodating the various optical means in an exchange unit.

An added advantage of the arrangement is that cavity 9 is capable of accommodating other suitable optical instruments, such as a TV camera to be used as an auxiliary navigation tool when entering a port. Also in this case, a Dove prism incorporated in cavity 9 will prevent the image from rotating in bearing when mirror 14 rotates together with upper part 11. A TV camera thus disposed takes advantage of the fact that the arrangement is usually located on the most favourable place of the ship.

I claim:

1. An arrangement for the detection of targets, comprising:

a detector unit rotatable about an at least substantially vertical search axis, provided with focusing means and first and second detectors of a line array type for cyclically generating a two-dimensional image representing the surroundings of the arrangement;

a target extractor connected to the first and second line array type detectors for generating directions of detected potential targets;

a staring array type detector for the possible identification of detected potential targets as real targets or as false targets;

whereby a pointing direction of an optical axis of the staring array type detector is controlled on the basis of the data generated by the target extractor.

2. An arrangement as claimed in claim 1, wherein the optical axis of the staring array type detector at least substantially coincides with the search axis.

3. An arrangement as claimed in claim 2, wherein the detector unit is arranged for rotating around a hollow search axis and the staring array type detector is accommodated in the hollow search axis.

4. An arrangement as claimed in claim 3, wherein a wall section of the hollow search axis that projects beyond the detector unit is provided with an optical window.

5. An arrangement as claimed in claim 4, wherein the hollow search axis comprises a mirror, an azimuth direction and an elevation direction of which can be adjusted such that radiation emanating from a selected potential target is passed onto the staring array type detector.

6. An arrangement as claimed in claim 5, wherein the optical windows angular position can be adjusted such that its azimuth direction at least substantially corresponds with the mirror's azimuth direction.

* * * * *